United States Patent

Madden

[11] Patent Number: 5,937,848
[45] Date of Patent: Aug. 17, 1999

[54] PUMPING AND HEATING DEVICE

[76] Inventor: Charles Madden, Katherine Bank, Chapel Green, Earlsferry, Elie, KY9 1AD, Fife, United Kingdom

[21] Appl. No.: 08/757,259

[22] Filed: Nov. 27, 1996

[30] Foreign Application Priority Data

Nov. 27, 1995 [GB] United Kingdom ............... 9524219

[51] Int. Cl.[6] .................................................. F24C 9/00
[52] U.S. Cl. .......................................... 126/247; 122/26
[58] Field of Search ............................ 126/247; 122/26; 237/1 R; 417/337

[56] References Cited

U.S. PATENT DOCUMENTS

| 4,236,504 | 12/1980 | Cornelison, Jr. | 126/247 |
| 4,325,354 | 4/1982 | Fuchs | 126/247 |
| 4,424,796 | 1/1984 | Fish | 126/247 |

FOREIGN PATENT DOCUMENTS 2242940  10/1991  United Kingdom .

OTHER PUBLICATIONS

Matzen, R. and Moller, F., "Hot–Water Generators Water Brakes for Wind Power Plants," (pp. 1–60), (Feb., 1978).

Primary Examiner—James C. Yeung
Attorney, Agent, or Firm—Hamilton, Brook, Smith & Reynolds, P.C.

[57] ABSTRACT

A wind operated heating device is operated by a rotor. The heater has a liquid reservoir and a rotary element which is immersed in the liquid in the reservoir. The rotary element is driven by the rotor so as to heat the liquid. The rotor is connected to the rotary element by a shaft. A shield is arranged to rotate with the rotary element and is movable relative thereto such that the position of the shield member relative to the rotary element varies in dependence on the rotation speed of the rotary element so that the shield member provides a greater resistance to rotation at higher than at lower speeds of rotation.

14 Claims, 7 Drawing Sheets

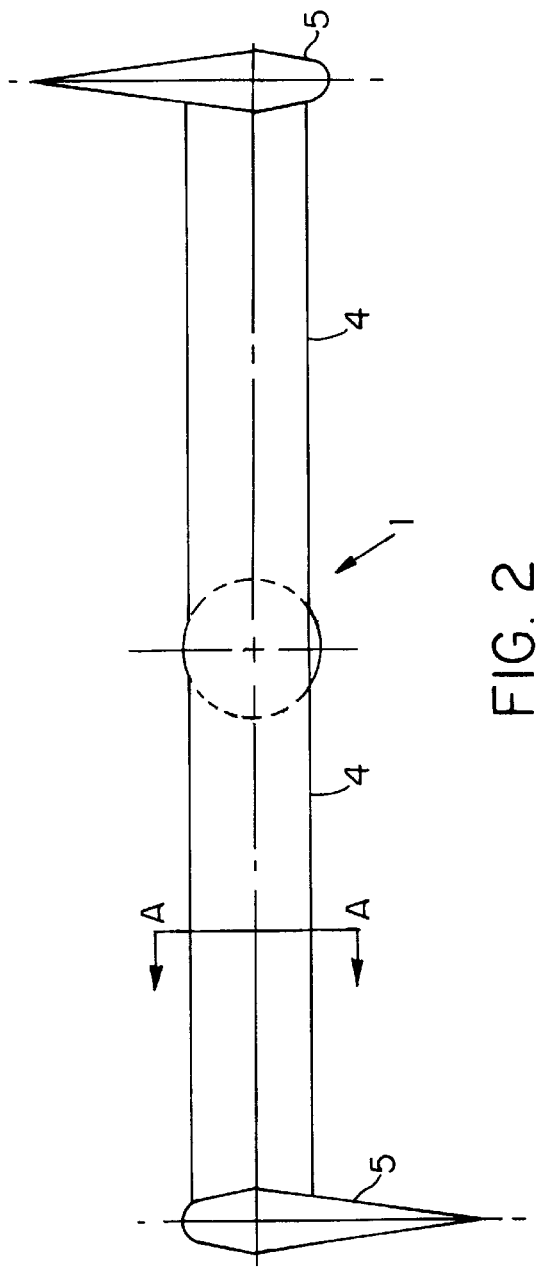
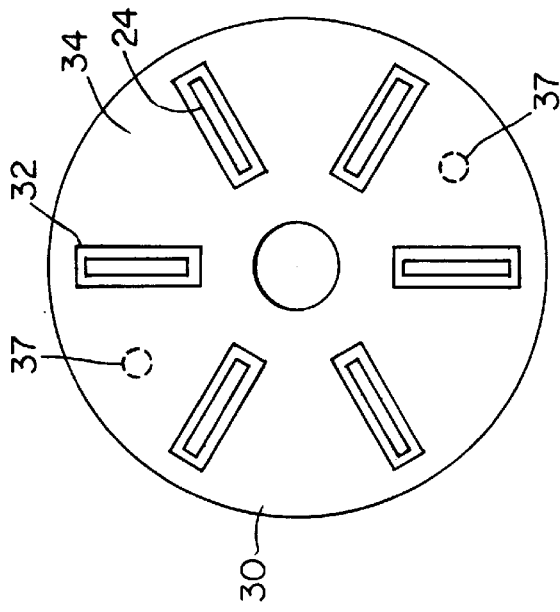
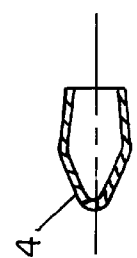

PUMPING AND HEATING DEVICE

FIELD OF THE INVENTION

The present invention relates to pumping and heating devices using power obtained for example from a wind-driven rotor to drive a pump or a liquid heater respectively.

BACKGROUND TO INVENTION

Wind-powered heating and pumping devices are known which have a rotor adapted to be driven in rotation by wind. The rotor is connected to a rotary member which, in the case of a wind-powered heating device, is contained in a liquid reservoir of a heater. Rotation of the rotary member, which is immersed in the liquid of the reservoir, causes the liquid to be heated through joule heating. A drive shaft connects the rotor and the rotary member so that the rotary member is rotated as the rotor is driven by the wind.

One problem with wind-powered devices is the need to control the maximum operating speeds to avoid physical failure of the devices. This problem arise since the power generated by the rotor rises with the cube of the wind speed whereas the load power (i.e. the power required to drives the load) may rise only linearly with rotor speed. Thus, the load itself does not prevent excessive speeds being reached. It has been proposed to construct the rotor such that it will alter its configuration at high speeds so that its efficiency is greatly reduced. Such solutions are not particularly satisfactory since they require the rotor to having moving parts which are liable to failure. Also these devices are such that the efficiency of the device is greatly reduced to control speed and available power is therefore wasted.

It has been proposed in the applicant's earlier Application No. GB-2242940 to construct the rotary member, which is immersed in a liquid reservoir, with two arms which spread out under the action of centrifugal force during rotation. Thus, as the speed of the rotor increases, the resistance to rotation provided by the rotary member in the liquid reservoir also increases to thereby have a braking effect on the rotor. However, the frequent movement of the arms of the rotary member inwardly and outwardly can lead to wear and ultimately to failure of the rotary member. This in particularly undesirable with wind-powered devices which typically are required to be of low cost and high reliability.

It has been proposed also to provide a wind heater which has a rotary arrangement, in addition to the rotor, externally of the liquid heater. The rotary arrangement has arms which move outwardly as the wind speed increases under the action of centrifugal force. As the arms extend outwardly, they are arranged to act downwardly on a rotating shaft. The rotary shaft is connected to a stationary shield which is movable up and down with respect to baffle plates. The position of the shield relative to the baffle plates determines the amount of resistance encountered by the rotary member in the liquid reservoir so that at high wind speed the resistance to rotation is increased so as to slow the rotor. This arrangement suffers from the disadvantage that a bearing has to be provided between the rotating shaft and the shield which is static. This bearing may become worn leading to failure of the shield and possible damage to the rotor which will not be braked at high speeds. Additionally, bearings are relatively expensive. As discussed above, this is undesirable as wind powered heating devices are required to be of high reliability and low cost. Furthermore, the mechanism used to move the shield is relatively complex which again undesirably increases the cost of the device.

It is the aim of embodiments of the present invention to provide arrangements which are reliable and hence reduce the number of moving parts required.

SUMMARY OF THE INVENTION

According to one aspect of the present invention, there is provided a heating device comprising:
  rotatable driving means;
  a heater comprising a liquid reservoir and rotary means at least partially immersed, in use, in liquid within the reservoir and arranged to be driven in rotation so as to thereby heat the liquid;
  means connecting the rotary means to the rotatable driving means to be driven thereby; and
  a shield member arranged to rotate with said rotary means and movable relative thereto such that the position of said shield member relative to the rotary varies in dependence on the rotation speed of the rotary means so that the shield member provides a greater resistance to rotation at higher speeds than at lower speeds of rotation.

By using a shield member which is arranged so as to rotate with the rotary moans, the difficulties with the prior art caused by relative movement between a non-rotating slowing member and a rotating heating member are avoided. Thus, wear between the parts can be reduced leading to a more reliable apparatus. Additionally, the need for expensive parts such as bearings is removed so that embodiments of the invention can be provided at relatively low cost.

Preferably, a rotary arrangement is arranged to rotate with said rotatable driving means, said rotary arrangement comprising at least one arm movable outwardly under the action of centrifugal force, said shield member being coupled to said arm, wherein the position of said at least one arm and the shield coupled thereto is dependent on the speed of rotation of said rotable driving means. Thus, embodiments of the invention may have a simple yet reliable mechanism for causing movement of the shield.

The or each arm may be pivotably connected to the connecting means. By use of a simple connection between the or each arm and the connecting means, it is possible to achieve a simple, yet reliable connection. Thus, the shield can be arranged so as to rotate with the rotary means as a result of the connection with the connecting means. Preferably, the rotary arrangement is external to the reservoir. Thus, even if the arms are damaged, it is relatively easy to replace them not only because of the simple connection to the drive means but also as the arrangement is external to the liquid reservoir. Thus, it is easy to determine whether there is a problem and, if so, to remedy it.

The shield may be coupled to the or each arm by a respective link member, the or each link member being pivotally connected at one end region to the respective if and connected at the other end region to the shield. Again, the simple connection between the shield and the arm reduces the likelihood of failure and additionally reduces the costs involved as compared to the prior art which requires more costly arrangements. The connection between the shield and the or each link member may be a fixed connection which may be obtained by, for example, welding. As will be appreciated, preferably one link is provided for each arm. These link members may comprise a rod which may be cheap yet reliable.

Preferably, stationary interacting means are provided in said liquid reservoir for interacting with said rotary means.

According to a second aspect of the present invention, there is provided a heating device comprising:
  a rotatable driving means;
  heater comprising a liquid reservoir and rotary means at least partially immersed, in use, in liquid within the reservoir and arranged to be driven in rotation so as to thereby heat the liquid;

means connecting the rotary means to the rotatable driving means to be driven thereby;

a movable shield member for changing the resistance to rotation of the rotatable driving means in dependence on the speed thereof, wherein the position of the shield member influences the resistance to rotation of the driving means and is alterable in dependence on the rate of flow and/or pressure difference in the liquid in the liquid reservoir, said rate of flow and/or pressure difference in the liquid being dependent on the speed of rotation of the rotatable driving means.

With this arrangement, it is possible to reduce further the number of moving parts required in that the force generated by flow and/or pressure difference in the liquid in the liquid reservoir is used to alter the position of the movable shield. By reducing the number of parts required, the cost of the heating device is reduced and further, its reliability is increased.

The shield member may be arranged adjacent further interacting means provided in the liquid reservoir for interacting with the rotary means.

Preferably, centrifugal pump means are provided in the liquid reservoir for generating said flow of liquid. This flow is preferably circular. The centrifugal pump means may comprise a rotatable member coupled to said rotatable driving means to rotate therewith. The centrifugal pump means may thus generate a flow and/or pressure difference in the liquid, the rate and/or size of which depends on the speed of rotation of the rotatable driving means and which provides a force sufficient to move the shield member when the speed of rotation of the rotatable driving means exceeds a given level. The rotable member providing the centrifugal pump means preferably has a plurality of blades. Alternatively, the rotary means may be arranged also to provide to the centrifugal pump action. However, it is preferred that a separate pump means be provided so that it can be ensured that a sufficient force to move the shield member can be generated when appropriate.

A portion of said connecting means may be immersed in the liquid reservoir, said portion of the connecting means being hollow and having a plurality of openings to permit the flow of liquid through said portion of the connecting means. Preferably, the device is arranged so that liquid flows downwardly through said portion of the connecting means and upwardly through the liquid reservoir to move the movable shield member upwardly when the speed of rotation of the rotatable driving means exceeds a given value. In one variation, at least one temperature sensitive device is provided for changing the size of at least some of said openings, so that when the temperature exceeds a given level, the size of the openings is altered to change rate of flow of liquid in the liquid reservoir whereby the shield member moves to a position in which the resistance to rotation of the rotatable driving means is increased. Thus, the size of the opening will be altered in dependence on the temperature in the liquid reservoir.

Interacting means may be provided in the liquid reservoir for interacting with the rotary means. It should be appreciated that the interacting means and the member may be provided by a single member in some embodiments of the invention.

The outlet openings in the connecting means may be provided adjacent the rotary means and/or the centrifugal pump. Rotation of the centrifugal pump means and/or the rotary means urges the liquid out of the connecting means to thereby generate the circular flow of fluid.

The interacting means are preferably arranged on a first side of the rotary means and the centrifugal pump means are preferably arranged on a second side of the rotary means, opposite to said first side. In this way, the rotary means can interact with the interacting means and the centrifugal pump means can cause a sufficient flow and pressure difference in the liquid to alter the position of the shield member in certain circumstances. The interacting means are preferably stationary and comprise a plurality of plates.

Each plate of the interacting means may be substantially L-shaped and have a first portion of the plate extending substantially perpendicular to an axis of rotation of the connecting means and a second portion extending along a portion of a wall of the liquid reservoir. The movable shield member is preferably arranged to move relative to the first portions of the plates of the interacting means. It is preferred that the second portions of the plates of the interacting means extend past end regions of said rotary means and/or centrifugal pump means. This is advantageous in that an increased heating effect can be achieved. In other embodiments of the present invention, the shield member may be arranged to move relative to the rotary means. However, it is preferred that the shield move relative to the stationary means in that this is simpler and hence cheaper to implement.

In both of the described aspects, stop means are preferably provided for defining a highest and/or a lowest position for the movable shield member.

Another problem which wind heaters tend to suffer from is overheating of the liquid of the reservoir. Typically, this can result from a loss of liquid from the reservoir and/or a reduction in the volume of heat exchange liquid provided around the reservoir. Overheating can permanently damage the device.

Preferably, therefore, said device is coupled to a temperature sensitive device, which when the temperature exceeds a given level is arranged to cause the shield to move to a position relative to rotary means such that the resistance to rotation of the rotary means is increased. In this way, the speed of the rotatable driving means can be slowed down and accordingly the energy imparted to the liquid reduced. In that way, the temperature of the liquid in the reservoir can be prevented from overheating. The temperature sensitive device is preferably incorporated in the stop means.

According to a third aspect of the present invention, there is provided a heating device comprising:

rotatable driving means;

a heater comprising a liquid reservoir and rotary means at least partially immersed, in use, in liquid within the reservoir and arranged to be driven in rotation so as to thereby heat the liquid;

means connecting the rotary means to the driving means to be driven thereby;

movable member arranged to move in said reservoir wherein the position of said member in the reservoir influences the resistance to rotation of the rotatable driving means; and a temperature sensitive device which when the temperature exceeds a give level is arranged to cause the member to move to a position such that the resistance to rotation of the rotary means is increased.

As discussed hereinbefore, the provision of a temperature sensitive device allows the speed of the rotary means to, in effect, be reduced as the resistance to rotation of the rotary means is increased. This in turn leads to a decrease in the temperature of the liquid or at least prevents excessive further heating of that liquid.

The temperature sensitive device can act directly or indirectly on the member which may be in the form of a shield member. For example, the shield member and temperature sensitive device could be in contact so that movement of the temperature sensitive device causes the shield member to move. Alternatively, the temperature sensitive device could alter the size of the openings in the connecting means, as described in relation to the previous aspect, in order to change the flow rate of the liquid and hence the position of the shield member.

The shield member may be movable with respect to the rotary means. Alternatively, the shield member may be movable with respect to a stationary interacting means provided in the reservoir for interacting with the rotary means. The movable member may also comprise the movable arm of a rotary means.

The temperature sensitive device may include a wax material which when heated expands to cause movement of the shield so as to increase the resistance to rotation of the rotary means. In that way, a reusable temperature sensitive device is provided. When the wax material melts, it expands and, on the other hand, when the temperature falls below a given value, the wax material solidifies and contracts to its original size so as to be reusable.

This wax material may be arranged in the housing which is coupled to the shield member, said housing having flexible walls which extend when said wax material expands to thereby move said shield member. The flexible walls are preferably in the form of a bellows type arrangement. This construction is both simple and reliable and is also cost effective.

The heater in any of the three above-described aspects may be such that the rotary means comprises a member with a plurality of blades extending therefrom. The shield member may comprise a plate member with a plurality of cut-out portions through which the plurality of blades of the rotary means are arranged to extend, whereby the proportion of each blade extending through the shield determines the resistance to rotation of the rotary means. In one embodiment, if the blades extend by a large amount through said shield, then the resistance to rotation is maximised whilst if the blades only extend by a small amount, or even not at all, through the shield, then the resistance to rotation is minimised. The rotary means preferably cooperate with one or more stationary interacting means in the form of baffle plates. In alternative embodiments, the shield member may move relative to the interacting means. The interaction between the baffle plates and the blades of the rotary means provides a churning effect which increases the heating effect caused by rotation of the rotary means.

It is preferred that the baffle plates are L-shaped and extend down the side of liquid reservoir as this increases the heating effect achieved.

The connecting means may comprise a shaft, with the driving means being mounted at one end of the shaft and the rotary means being mounted at the other end of the shaft.

The driving means may comprise a rotor which in arranged to rotate about a vertical axis and which comprises a generally horizontal section formed out of aerofoil blades and has foils mounted generally vertically on the ends of the horizontal section. This arrangement is preferred in that the horizontal part of the rotor may be arranged to cause rotation of the rotor at lower speeds with the vertical foils driving the rotor at higher speeds. At very high wind speeds the main driving force may again be provided by the horizontal part of the rotor.

It is preferred that a floating weight be located in the reservoir to float above the rotary means such that it will rest on the rotary means and act as a brake on it if the liquid level falls below a given level in the reservoir. In that way, damage to the heating device can be prevented in the case of liquid leakage.

It will be appreciated that embodiments of the invention are not limited to wind powered devices but may also have applications to other fluid powered heating devices. Additionally, the various features described in relation to the first, second and third aspects respectively can be used in relation to the other aspects respectively.

According to a fourth aspect of the present invention, there is provided a method of heating liquid provided in a reservoir comprising the steps of:

driving rotary means within the liquid reservoir to thereby heat the liquid;

moving a movable shield member relative to the rotary means, the position of the shield member relative to the rotary means being dependent on the speed of rotation thereof, whereby when the speed of rotation exceeds a given level, the resistance to rotation of the rotary means is increased.

According to a fifth aspect of the present invention, there is provided a method of heating liquid provided in a reservoir comprising the steps of:

driving rotary means within the liquid reservoir to thereby heat the liquid; and providing temperature sensitive means in said reservoir, wherein when the temperature in the reservoir exceeds a given value, the temperature sensitive device causes said movable shield to adopt a position in which the resistance to rotation of the rotary means is increased.

According to a sixth aspect of the present invention, there is provided a method of heating liquid provided in a reservoir comprising the steps of:

driving rotary means within the liquid reservoir to thereby heat the liquid; and generating a circular flow and/or pressure difference in the liquid in said reservoir whereby when the rate of flow and/or the pressure difference in the liquid in said reservoir exceeds a given value, a movable member is caused to move so that the resistance to rotation of the rotary means is increased.

According to a further aspect of the present invention, there is provided a pumping device comprising:

a rotatable driving means;

a fluid inlet coupled to a fluid source and a fluid outlet;

rotary means coupled to said rotatable driving means so that in use the rotary means is driven by the rotatable driving means to draw fluid from the fluid source via the fluid inlet and to cause the fluid to move to said fluid outlet, said rotary means being at least partially immersed in a reservoir which in use is at least partially filled with fluid; and means for preventing the speed of the rotatable driving means from exceeding a given value.

Movement of the rotary means, which is driven by the rotatable driving means causes fluid to be drawn from the fluid source and to be moved to the fluid outlet. The fluid source may be, for example, a well. The fluid outlet may be coupled to an irrigation system for use on farms or the like. Furthermore, the means for preventing excessive speeds of the rotatable driving means can avoid damage to the pumping device being caused by excessive speed.

The preventing means can comprise a movable member arranged to move relative to interacting means, the interacting means and the movable member arranged to be at least partially immersed in the fluid in the reservoir, whereby the position of the movable member relative to the interacting means varies in dependence on the speed of the rotary driving means so that a higher resistance to rotation at higher speeds than at lower rotation speeds is provided. In this way, the resistance to rotation of the rotatable driving means can be varied in dependence on the speed of rotation of the rotatable driving means.

Preferably, the movable member comprises a substantially planar shield member having a plurality of openings and the interacting means comprises a plurality of blades arranged to extend through said openings whereby the extent by which the blades extend through the openings depends on the speed of rotation of the rotary driving means. In this way, a simple yet reliable way of preventing excessive speeds of the rotatable driving means can be achieved.

The movable member and said interacting means may be arranged so as to not rotate in said reservoir. The interacting means may be fixed relative to the reservoir and the movable member arranged to move relative thereto. However, in alternative embodiments of the invention, the movable member and the interacting means may be arranged so as to rotate with the rotatable driving means.

Preferably, second interacting means are provided for interacting with the first interacting means to prevent the speed of the rotatable driving means from exceeding a given value. The function of the second interacting means may be provided by the rotary means. However, in a preferred embodiment of the present invention, a further separate interacting means is provided. The degree of interaction between the first and second interacting means will depend on the position of the movable member relative to the first interacting means.

The second interacting means may be arranged to rotate with the rotatable driving means. However, in a situation where the movable member and the first interacting means rotate with the rotatable driving means, the second interacting means are preferably stationary.

The second interacting means may comprise a plurality of blades. The rotary means may also comprise a plurality of blades.

The fluid inlet is preferably arranged at a lower end region of said rotatable driving means. In this way, fluid may be drawn up into the pumping devices. The rotatable driving means preferably comprises a hollow shaft through which fluid from the fluid inlet means may be drawn. The shaft preferably has a plurality of openings in a portion of the shaft in said reservoir, whereby fluid from the fluid inlet can pass through the openings in the shaft into the reservoir.

Preferably, the openings are provided adjacent said rotary means, said first interacting means and/or said second interacting means. In the preferred embodiment of the present invention, the openings are provided adjacent the rotary means and the second interacting means.

The openings are preferably provided between each adjacent pair of blades defining the rotary means, the first interacting means and/or said second interacting means.

A channel is preferably provided between the reservoir and the fluid outlet. The channel may be arranged in the form of a scroll around the outside of the reservoir. In that way, fluid can be conveyed from the fluid source to the fluid outlet.

According to a further aspect of the present invention, there is provided a method of pumping liquid from a fluid source comprising the steps of:

driving rotary means within a reservoir to draw fluid from a fluid source and to cause said fluid to move to a fluid outlet; and preventing the speed of the rotary means from exceeding a given value.

According to a still further aspect of the present invention, there is provided a wind operated device comprising:

a wind driven rotatable driving means;

a reservoir which in use is at least partially filled with fluid;

a rotary means coupled to the rotatable driving means, said rotary means being arranged in said reservoir; and interacting means for changing the resistance to rotation of the ratable driving means in dependence on the speed thereof, wherein the position of the interacting means influence the resistance to rotation of the driving means and is alterable in dependence on the rate of flow of liquid in the reservoir, said rate of flow being dependent on the speed of rotation of the rotatable driving means.

The wind operated device may be a heater or a pump.

BRIEF DESCRIPTION OF DRAWINGS

For a better understanding of the present invention and as to how the same may be carried into effect, reference will now be made by way of example to the accompanying drawings in which:

FIG. 2 is a plan view of the rotor device;

FIG. 3 is a section on the line A—A of FIG. 2;

FIG. 5 is a view along line B—B of FIG. 4 of part of a rotary element and its shield;

DESCRIPTION OF PREFERRED EMBODIMENTS

Figure 1:
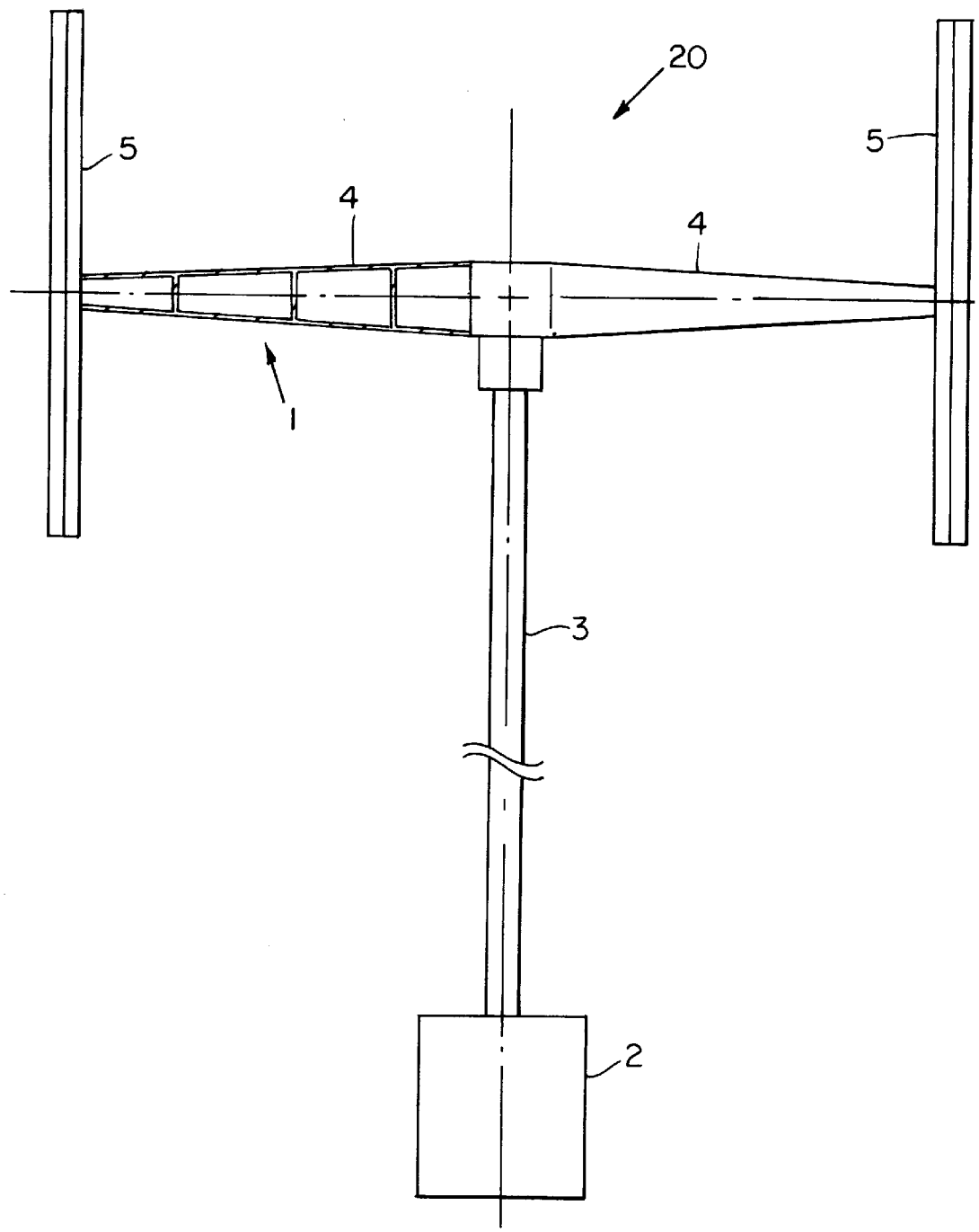
FIG. 1 is a side elevation of a wind-powered device.

As shown in FIGS. 1 to 3, the device 20 consists of a rotor 1, a wind pump or a cylindrical liquid heater 2 and a connecting drive shaft 3. The device 20 may be arranged for example to pump water from a well to for example fields. Alternatively, the device 20 may be arranged to heat liquid. The drive shaft 3 is hollow.

The device 20 is supported with the shaft 3 vertical by support and bearing means not shown. The rotor comprises a horizontal section of arms 4 in the form of cut-off aerofoil blades (Savonius blades). FIG. 3 shows a cross-section through one of the arm. Vertically extending foils 5 (Darrius blades) are mounted on the ends of the arm 4. The lower end region of the shaft 3 is housed within the wind pump or heater 2.

Figure 4:
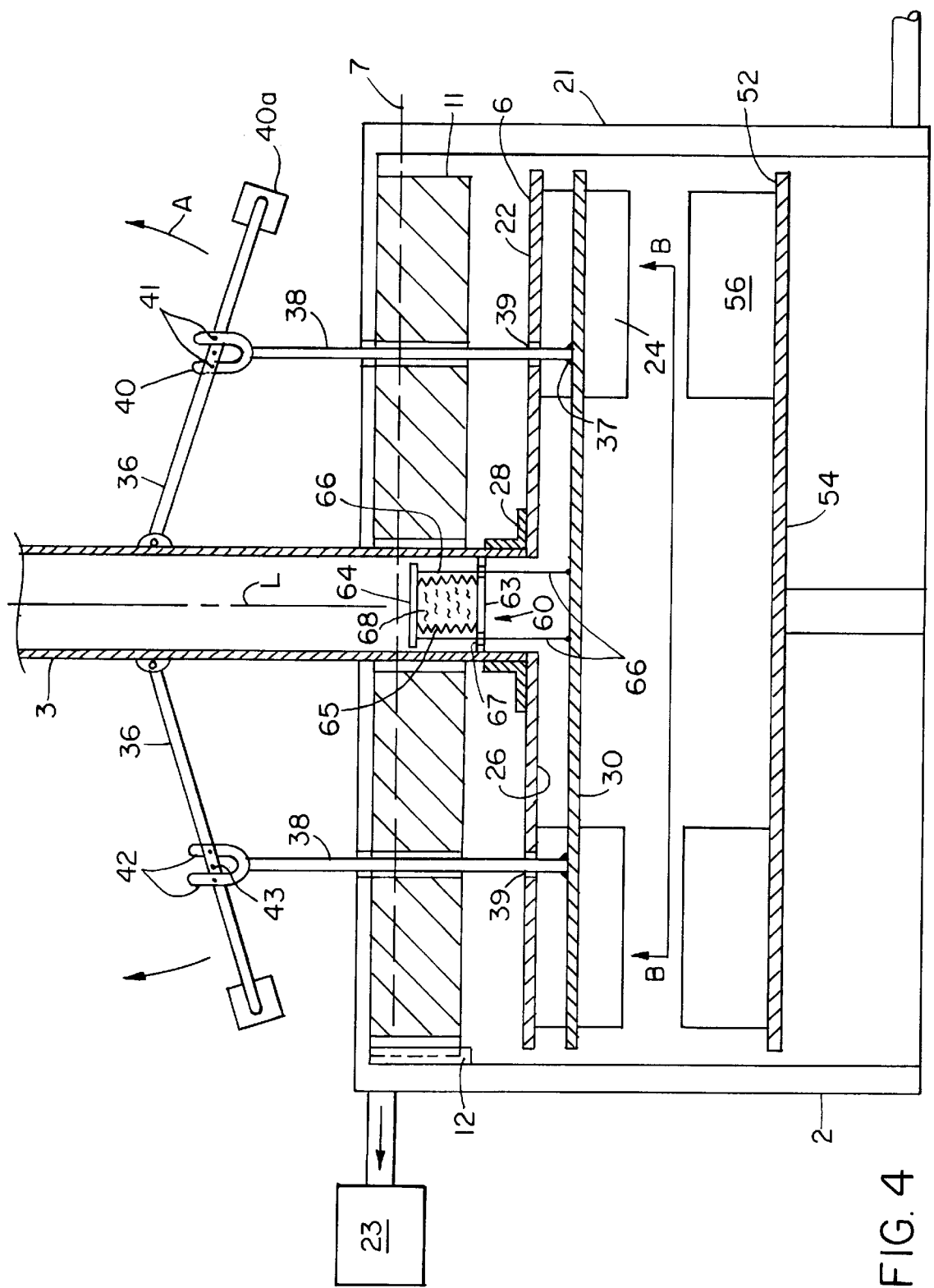
FIG. 4 is an enlarged part-section through a first liquid heater embodying the invention.

A first liquid heater 2 will now be described with reference to FIGS. 4 and 5. The liquid heater 2 is surrounded by a jacket 21 through which water passes to the heating system 23. The water in the jacket is heated through contact with the walls of the heater 2. The liquid heater 2 is filled with for example water or oil whose correct level is indicated at 7. At the lower end region of the shaft 3, there is a rotary element 6 which has a circular planar portion 22 which has a diameter which is less than that of the liquid heater 2. A number of blades 24 are attached to the lower surface 26 of the circular portion 22. In the preferred embodiment, eight blades 24 are used but any other suitable number of blades can also be used. Each blade 24 is a generally thin rectangular block with the length of the block extending along a radius of the circular portion 22. The thickness of each block is generally very much less than the length thereof. The rotary element 6 is mounted to the shaft 3 by a mounting element 28 which permits the rotary element 6 to rotate with the shaft 3, without any relative movement therebetween. Rotation of the rotary element 6 in the liquid heater causes the liquid in the liquid heater 2 to be heated.

A shield 30 is provided which is mounted, as will be described in more detail hereinafter so as to rotate with the shaft 3. The shield 30 comprises a circular plate 34 with a number of rectangular cut-out portions 32, as can be seen clearly from FIG. 5. These cut-out portions 32 are arranged so as to be larger than the cross-section of the blades 24 of the rotary element 6. In particular, the blades 24 are arranged to extend through respective cut-out portions 32 of the shield 30. Thus, the cut-out portions 32 correspond in position to the arrangement of the respective blades 24 on the circular portion 22 of the rotary element 6.

The shield 30 is mounted to two arms 36 by two rigid link members 38. The link members 38 are fixedly connected, at one end, to the shield member 30 by for example welding. Thus, the link members 38 are arranged to extend generally parallel to the longitudinal axis L of the shaft 3. The link members 38 are connected to the shield at locations 37 between respective cutout portions 32. Apertures 39 are provided in the circular portion 22, between respective blades 24 so as to allow the link members 38 to pass therethrough. The other end of each link member 38 is pivotably mounted to the arms 36 using any suitable mechanism. In the embodiment shown the link members 38 each have a U-shaped connector 40 with apertures 41 extending through the ends-of two arms 42 of the U-shaped connector 40. The arms 36 are each provided with a corresponding aperture 43. A pin (not shown) passes through one aperture 41 of the U-shaped connector 40, then the aperture 43 of the arm 36 and finally through the other aperture 41 of the U-shaped connector 40. The arms 36 are thus pivotally connected to the link member 38. At the free end of each arm 36, there is a fly weight 40a.

The other end of each arm 36 is pivotally mounted to the drive shaft 3 so that the arms 36 rotate together with the drive shaft 3. Any suitable arrangement can be used for pivotally mounting the arts 36 to the drive shaft 3. Thus, the arms 36 are able to move outwardly and upwardly in the direction of arrow A under the action of centrifugal force when the speed of rotation of the shaft 3 exceeds a certain value. Two arms 36 are shown in FIG. 4, but it should be appreciated that any suitable number of arms 36 and associated link members 38 can be provided.

Fixedly connected to the bottom region of the liquid heater 2 is a baffle arrangement 52 which comprises a circular plate 54 on which a number of blades are arranged. The number of blades 56 of the baffle arrangement may be the same as for the rotary element 6 but in some embodiments the baffle arrangement 52 may have more or less blades 56 than the rotary element 6. The baffle arrangement 52 may have a similar configuration to the rotary element 6. However, the baffle arrangement 52 does not rotate and the blades 56 extend upwardly whilst with the rotary element 6, the blades 24 extend downwardly.

The shield 30 is further supported by a temperature sensitive mounting arrangement 60 coupled to the interior of the shaft 3. In particular, the mounting arrangement 60 comprises a first lower plate 63 and a second upper plate 64. The lower plate 63 is fixedly mounted to the inside of the shaft 3. The upper plate 64 is connected to the lower plate 63 by flexible walls 65 in the form of copper bellow. The walls 65 and the two plates 63 and 64 define a housing in which a wax element 68 is sealed. The upper plate 64 is connected to the shield 30 by two wires 66 which extend through apertures 67 provided in the lower plate 63. The wires 66 are connected at one end to the shield 30 and at the other end to plate 64. The wax element 68 is sealed in the mounting arrangement 60 which expands (for example when the wax melts) when the temperature in the heater 2 exceeds a predetermined level. The upper plate 64 is free to move relative to the bottom plate 63, which is fixed relative to the shaft 3. The diameter of the upper plate 64 is selected so as to be slightly smaller than the internal diameter that of the shaft 3 so as to be free to move relative thereto in a upward and downward direction as will be described in more detail later.

Finally, a floating weight 11 surrounds the shaft 3 above the rotary element 6 and is prevented from rotating by the engagement of a stop 12 on the side wall of the liquid heater 2 cooperating with a corresponding formation formed in the weight 11. If the liquid level in the heater falls substantially, the weight will come to rest on the rotary element 6 and act to brake it. However, in view of the temperature sensitive arrangement 60, it may not be necessary to provide this weight.

The operation of the rotor will now be described. In the case of the Darrius foils 5, the apparent wind at the foils is the vector sum of the wind speed and the foil speed impinging at an apparent angle alpha. At slow foil speeds, this angle is large and the foils are stalled. As the foil speed is increased, for a given wind speed, the angle alpha becomes smaller and at a certain point the foils unstall and generate forward thrust which accelerates the foils to a maximum speed. Typically, the foils will be at their most efficient and develop maximum torque when the ratio of their speed to wind speed is about 10:1. The efficiency of the foils is reduced when this ratio is substantially lower or greater. Typically, such foils will stall when this ratio is lower than 4:1. Thus, it will be seen that a rotor 1 having Darrius foils 5 will need to be started by other means and got up to a sufficient speed for the foils to be unstalled. In the described embodiment, this is achieved by the horizontal section of the rotor formed by the blades 4 which provides an eccentric resistance to the wind to start the rotor turning and build up the speed to the condition where the Darrius foils become forward and they accelerate the rotor to the maximum speed of the prevailing wind speed.

The power/speed characteristic of the heater is designed such that it will absorb relatively little power as the rotor is accelerating to operating speed but will take a greater and greater proportion of available power to thereby heat the liquid as its speed approaches the desired maximum operating speed. Thus, at speeds approaching the desired maximum operating speed the heater will act as a brake on the device to restrain any further increase in speed.

In the described embodiment, as the speed of rotation of the rotor 1 increases, the speed of the drive shaft 3 also increases. When the speed increases beyond a given level, the arms 36 which are pivotally connected to the shaft 3 move outwardly and upwardly in the direction of arrow A under the influence of centrifugal force. Movement of the arms 36 outwardly and upwardly causes the shield 30 which is connected to the arms 36 to be lifted upwardly with respect to the rotary element 6. Thus, the extent by which each blade 24 extends through the shield 30 increases. This increases the resistance caused by the interaction of the blades 56 of the baffle arrangement 52 with the blades 24 of the rotary element 6 and thereby slows down the rotary element 6. This, in turn, provides a braking effect on the rotor 1. This can therefore prevent the rotor 1 from rotating at excessive speeds thus reducing the likelihood of damage to the device as a whole.

It should be appreciated that the greater the resistance caused by the interaction of the blades 56 of the baffle arrangement 52 with the blades 24 of the rotary element 6, the greater the heating effect on the liquid. This is assuming that the speed of the rotor is unchanged. The speed of the rotor also has an effect on the heating effect achieved. The greater the rotor speed 1, the greater the heating effect achieved, assuming that the position of the shield is unchanged. Therefore both the position of the shield 30 and the speed of the rotor have an effect on the heating effect achieved.

On the other hand, when the rotor speed falls below a given level, the arms 36 will move inwardly and downwardly, thus moving the shield 30 downwardly. This decreases the proportion of each blade 24 of the rotary element 6 extending through the shield 30. This in turn decreases the resistance to rotation of the rotary element 6 and thus provides a reduced braking effect on the rotor 1.

It will be appreciated that in high winds, the maximum operating speeds (as maintained by the braking effect of the shield 30 with respect to the rotary element 6) of the rotor 1 will lead to a reduction in the foil speed/wind speed ratio thus reducing the efficiency of the foils and the torque produced and aiding the prevention of excessive speeds. If wind speeds become sufficiently high, the ratio may fall sufficiently for the foils to stall and for the rotor to continue to rotate solely under the action of the blades 4 forming the horizontal section of the rotor 1 and at a substantially reduced speed.

If the temperature in the reservoir exceeds a given level, the wax element 68 of the mounting arrangement 60 expands and acts upwardly on the upper plate 64, the lower plate 63 being fixed. This expansion of the wax element 68 is caused by its melting. The movement of the plate 64 in an upward direction is permitted as a consequence of the flexible copper bellow walls 65. As the upper plate 64 moves upwardly, the shield 30 which is connected thereto by wires 66 also moves upwardly to thereby increase the proportion of each blade 24 of the rotary element 6 protruding through the shield 30 to increase the resistance to rotation of the rotary element 6, in the same way as described in relation to the movement of the arms 36. In this way, the speed of the rotor 1 can be reduced which in turn can reduce the heating effect provided by the rotary element 6. In that way, the temperature can be prevented from increasing further and may even be allowed to reduce. When the temperature decreases once again below the given level, the wax element 68 will solidify and contract. The plate 64 will move downwardly to thus cause the shield 30 to also move downwardly. This in turn reduces the resistance to rotation of the blades 24 of the rotary member 6.

It should be appreciated, that the temperature sensitive device 60 will have no effect on the position of the shield 30 when the arms 36 are extended outwardly so that the shield 30 is in its uppermost position. If, on the other hand, the arms 36 are in their lowermost position, the movement of the upper plate 64 is sufficient to move the shield 30 upwardly and will in effect cause the arms 36 also to move outwardly.

A second liquid heater 2' will now be described with reference to FIGS. 6 and 7. Like reference numerals will be used to indicate those parts which are the same as those of the first liquid heater 2. The liquid heater 2' is also filled with a liquid, for example water or oil. Unlike the first embodiment, there are no arms coupled to the shaft 3 which is connected to the rotor 1. The shaft 3 is rotated by the rotor 1 in the same manner as described in relation to the first embodiment. In this embodiment, the shaft 3 is of a hollow, cylindrical construction as can be seen from FIG. 6.

The shaft 3 is coupled to a first set of blades 100 and a second set of blades 102. The first set of blades 100 comprises a plurality of blades 101 each of which is coupled to rotate with the shaft 3. As will be discussed later, the first set of blades 100 perform a similar function to the rotary element 6 of the first embodiment.

The second set of blades 102 are arranged below the first set of blades 100 and are also coupled to the shaft 3 so as to rotate therewith. The second set of blades 102 also comprises a plurality of blades 103 which provide a centrifugal pump action, as will be discussed hereinafter. The shaft 3 does not extend right to the bottom of the liquid heater 2' but instead is supported at its lower end by a bearing arrangement 132. The second set of blades 102 is arranged to extend below the bottom of the shaft 3 and accordingly each blade 103 of the second set of blades 102 has a cut-out portion 134 to accommodate the bearing 132. This means that each blade 103 is coupled to the shaft 3 for only part of its height H2. It should be appreciated that in some embodiments, cut-out portions 134 will not be required in the blades. For example, different heating arrangements may be provided or the second set of blades may be provided at a different location on the shaft.

A suitable clearance 105 is provided between the first and second sets of blades 100 and 102 so that the sets of blades 100 and 102 do not interfere with each other. Typically, the first set of blades 100 will have blades 101 and the second set of blades 102 will have the twenty blades 103. Of course, the sets of blades 100 and 102 can have any suitable number of blades. Furthermore, the number of blades 101 in the first set of blades 100 may in certain embodiments be the same as the number of blades 103 in the second net of blades 102. Thus, in the preferred embodiment of the present invention, the blades 101 of the first set of blades 100 are not aligned with the blades 103 of the second set of blades 102. It is preferred but not essential that the first and second sets of blades 100 and 102 have similar dimensions.

A first series of openings 104 are provided in the shaft 3 adjacent the first blades 101. A second series of openings 106 are provided adjacent the second set of blades 102, in a similar manner. The openings 104 and 106 are each generally elongate slots. The first series of openings have a length generally corresponding to the height H1 of the blades 101. The second series of openings 106 have a height generally corresponding to the height of the part of the blades 103 which are coupled to the shaft 3. The openings 104 are therefore larger than the openings 106. However, the second series of openings can be the same size or even larger than the first series of openings 104. An opening 104 is provided between each pair of adjacent blades 101 of the first set of blades 100. The number of openings 104 is thus equal to the number of blades 101. The openings 106 are similarly arranged with respect to the blades 103 of the second set of blades 102. However, the respective number of openings can of course be greater than or less than the number of blades in the respective sets of blades.

Above the first set of blades 100 is a stator arrangement 107 which provides a similar function to the baffle arrangement of the first embodiment. The stator arrangement 107 comprises a number of, for example 7, L-shaped stationary blades 108 which are not coupled to the shaft 3 but are rather fixedly mounted to the interior wall 111 of the liquid heater 2'. A first part 109 of each stator blade 108 extends along a radius of the liquid heater 2', towards the shaft 3, whilst the second part 110 of each stator blade 108 extends along part of the length of the liquid heater 2'. More particularly, the second part 110 of each stator blade 108 is mounted to the wall 111 of the liquid heater 2' and extends to the bottom of the liquid heater 2'. As can be seen particularly from FIG. 6, the second part 110 of the stator blades 108 extend down past the ends of the blades 101 and 103 of the first and second sets of blades 100 and 102. The first part 109 of each stator blade 108 thus has a length L3 which is greater than the length L1 or L2 of the blades 101 and 103 of the first and second sets of blades 100 and 102 respectively. As will be appreciated, the length L1 and L2 of the blades 101 and 103 are the same.

A shield 30' is arranged so as to be movable upwardly and downwardly relative to the stator arrangement 107. The shield 30' does not rotate relative to the stationary stator blades 108 and is thus not coupled to the shaft 3. This shield 30' is similar to that described in relation to the first embodiment but moves relative to the stationary arrangement i.e. the stator arrangement 107 whereas in the first embodiment the shield moves relative to the rotary element. So as to accommodate the differently shaped stator blades 108 of the second embodiment, the shield member 30' comprises a circular plate with elongate slits 113 to accommodate the stator blades 108. The configuration of the shield 30' is shown in FIG. 7. The stator blades 108 are not coupled to the shaft 3 and are spaced therefrom by a distance x. This is so as to accommodate region 135 of the shield 30'.

The highest and lowest positions for the shield member 30' are defined by stops 112 and 114 respectively. The lower stop 114 comprises a temperature sensitive device similar to that described in relation to the first embodiment so as to provide protection against overheating. The lower stop 114 comprises a lower base member 116 which is fixedly secured to a stator blade 108 and is immovable. Secured to the lower base member are copper bellows 120. On the top of the copper bellows 120 is an upper plate member 122. The lower base member 116, the copper bellows 120 and the upper plate member 122 together define a housing for a wax element 118. As the upper plate member 122 is supported only by the copper bellows 120, the upper plate member 122 is free to move relative to the lower base member 116.

The upper stop 112 is fixedly attached to a stator blade 108, above the lower stop 114. As will be appreciated, in use, the shield 30' will not be able to move above stop 112 or below stop 114. Although only one upper and lower stop 112 and 114 are shown in the drawings, a plurality of such stops are preferably provided at locations spaced about the inner wall 111 of the liquid heater 2'.

Figure 6:
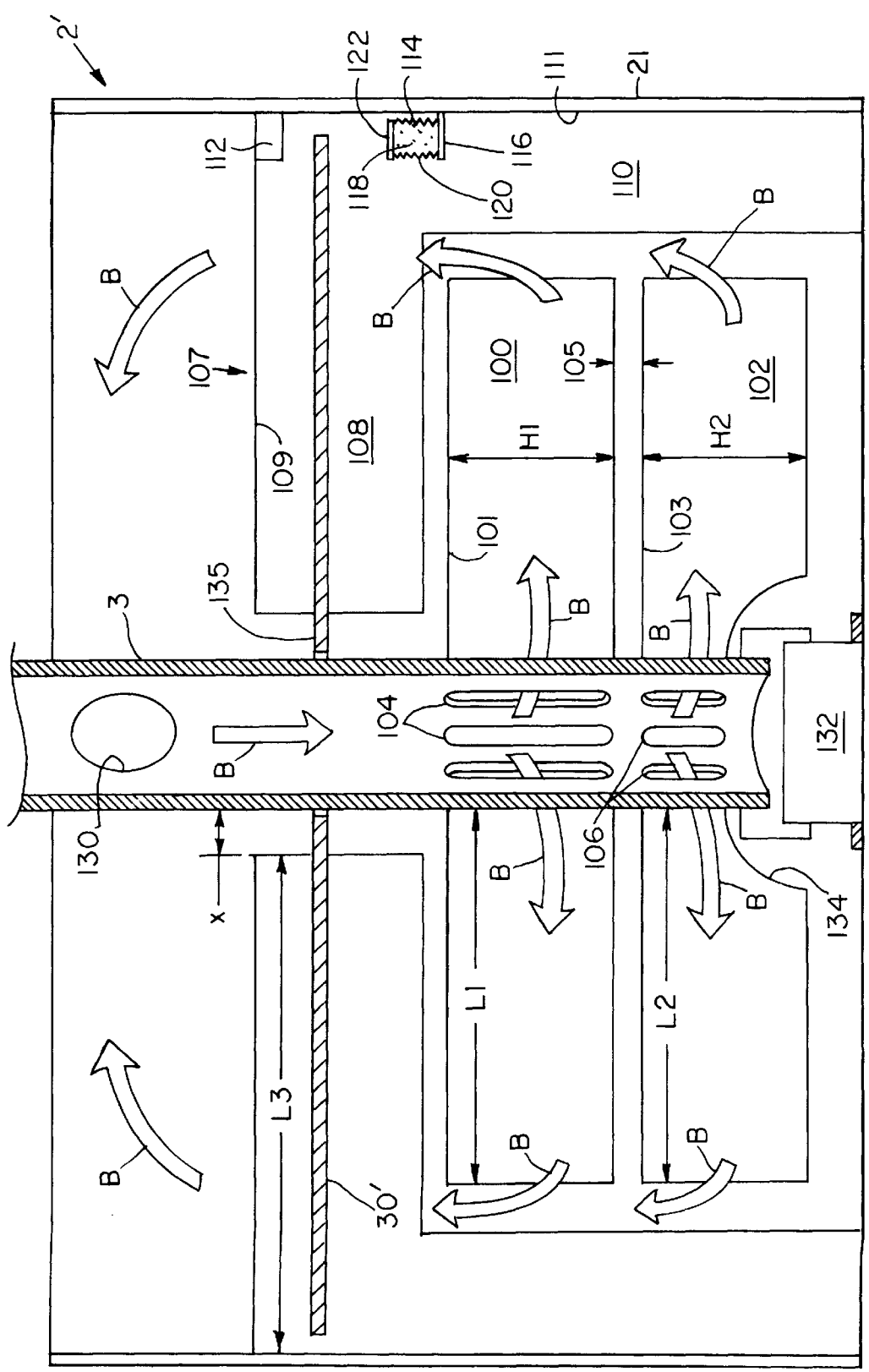
FIG. 6 is a part-section through a second liquid heater embodying the present invention.
Figure 7:
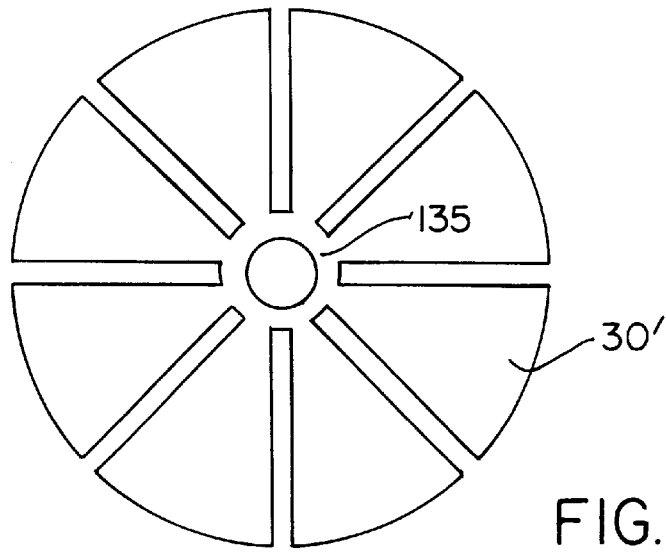
FIG. 7 shows a plan view of a shield of FIG. 6.

The shaft 3 additionally has a series of inlets 130 for example two or three although only one is shown in FIG. 6. These inlets 30 are arranged in the portion of the shaft 3 which is above the stator blades 108. As described earlier, the lower end of the shaft 3 is supported on the bottom of the liquid heater 2' by the bearing arrangement 132.

Typically, for a 10 kw/280 rpm device, the blades 101 and 103 of the first and second sets of blades will be around 600 mm in diameter and 50 mm high. Obviously other suitable dimensions for these blades can be used.

The operation of the device will now be described. When the shaft 3 rotates, it also causes the first set of blades 100 and the second set of blades 102 to rotate therewith as these sets of blades are coupled to the shaft 3. The rotation of the first and second sets of blades 100 and 102 has a heating effect on the liquid in the heater 2'. However, the first set of blades 100 will have the primary heating action as the blades 101 interact with the stationary stator blades 108 to provide a heating effect. The rotation of the shaft 3 also causes a circular flow of liquid in the liquid heater 2'. The circular flow of liquid is indicated by arrows B. In particular, liquid is drawn from the upper part of the liquid heater 2' through the inlets 130. The liquid is drawn down the inside of the shaft 3 and exits through openings 104 and 106. These openings 104 and 106 allow the liquid to be drawn through the shaft 3 and accelerated radially along the blades 101 and 103. The rotation of the gets of blades 100 and 102 and particularly the blades 103 of the second set 102 of blade members then causes the liquid to flow upwardly back to the upper part of the liquid heater 2'. In effect, the blades 103 of the second set 102 of blades act as a centrifugal pump to encourage this flow of liquid. The flow of liquid caused by the second set 102 of blades causes a pressure differential in the liquid reservoir. The first set of blades will also contribute to a lesser extent to this effect. The rate of flow of liquid through the liquid heater 2' will depend on the speed of rotation of the first and second sets of blades 100 and 102 and consequently the speed of rotation of the shaft 3. The greater the speed of rotation of the shaft 3, the greater the rate of flow and hence pressure difference of liquid in the liquid-heater 2'.

The flow of liquid back up to the upper part of the liquid heater 2' causes a pressure to be exerted on the underside of the shield. Accordingly, the position of the shield 30' relative to the stator blades 108 will be determined by the size of the upward force provided by the upward flow of liquid in the liquid heater 2' generated by rotation of the first and second sets of blades 100 and 102. The greater the rate of the flow of the fluid, the greater the upward force exerted by the liquid. The shield 30' will of course be urged downwardly as a result of its weight. When the shaft 3 is rotating sufficiently quickly, there will be a relatively large upward force caused by a relatively large upward flow rate of liquid on the shield member 30'. This upward force may be sufficiently large to overcome the downward force provided by the weight of the shield 30'. This causes the shield 30' to move upwardly relative to the stator blades 108. This increases the resistance caused by the interaction of the stator blades 108 with the blades 101 of the first set of the blades 100. This in turn provides a braking effect on the rotor.

If the speed of the shaft 3 then falls, the upward force generated by the flow of liquid upwardly in the liquid heater 2' will no longer be sufficient to lift the shield 30' upwardly. The shield 30' will then move downwardly and may come to rest on the top of the lower stop 114. As a smaller proportion of the stator blades 108 will then protrude from the shield 30', a reduced resistance to rotation is provided, thus reducing the braking effect on the rotor 1. As will be appreciated, the shield operates in a similar manner to that of the first embodiment. However, the mechanism by which the shield is moved is different.

In summary, the flow of liquid caused by the second set of blades increases with increased rotor speed. The pressure generated by the flow increases by a factor proportional to the square of the rotational speed. The second set of blades draws the fluid from above the shield member and exerts the generated pressure on the underside of the shield member. Thus, at higher speeds the pressure force made is greater than the weight of the shield member so it rises exposing more blade area in the churn region which increases the torque absorbed.

If the temperature in the liquid heater 2' exceeds a given level, the wax element 118 of the lower stop 114 expands i.e. melts which in turn acts on the upper plate ember 122 to move it upwardly. If the shield 30' is resting on the stop 114, the shield 30' will upwardly. Thus, the proportion of each stator blade 108 which protrudes through the shield 30' is increased which in turn increases the resistance to rotation of the first set of blades 100. In this way, the speed of the rotor can be reduced which in turn reduces the heating effect provided in the liquid heater 2'. The temperature can thus be prevented from increasing further and may even be allowed to fall. When the temperature decreases below the given level, the wax element 118 will solidify and cause the top plate member 122 to move downwardly. If the shield 30' is resting on the stop 114, the shield 30' will also move downwardly. Thus, the resistance to rotation of the blades 101 of the first set of blades 100 can be reduced, thus providing a reduced braking effect on the rotor 1.

It should be appreciated that the floating weight described in relation to the first embodiment can also be provided in relation to variations on the second embodiment. Additionally, as will be apparent to the skilled man, there are various other features of the first embodiment which can be incorporated in the second embodiment and vice versa. For example, the baffle arrangement of the first embodiment could be modified so as to be similar to the stator blade arrangement of the second embodiment. The relative positions of the stator blades and the first and second sets of blades, may also be changed in the first embodiment so for example the stator blades may be at the bottom of the liquid heater.

In a modification to the second embodiment, the first and second sets of blades are replaced by a single get of blades providing both the heating and centrifugal pump effects.

In an alternative modification to the second embodiments, only one series of openings are provided, preferably next to the second set of blades.

In one modification to the second embodiment, the openings provided next to the blades in the abaft may be arranged so that the size thereof are altered by temperature sensitive devices. For example, plates could be provided which are connected to temperature sensitive devices of the type described hereinbefore. When the temperature is below a given level, the openings are relatively small, However, when the temperature exceeds the given level, the plates are moved to increase the size of openings and hence increase the rate of flow. As discussed previously, a relatively large flow will move the shield upwardly resulting in a braking effect being exerted on the rotor. In this way, protection against overheating can be achieved. Any suitable heat sensitive device can be used to control the size of the openings.

The first embodiment of the invention need not include the connection of the shield to the arms 36 but may only have the temperature sensitive device. Likewise, the second embodiment may be modified so that only the temperature sensitive device can move the shield. Instead of the wax element, any other suitable temperature sensitive material can be used, for example a gas bubble or a material which becomes gaseous at a certain temperature. Alternatively, a bimetallic arrangement may be provided.

The device as shown may be used in a heater or a pre-heater for a domestic water supply, for heating the water directly or through a heat exchanger. In the preferred embodiments of the invention, a heat exchanger is used as is shown in FIG. 4.

As will be appreciated, the first and second embodiments of the present invention may not include the temperature sensitive devices.

A wind pump embodying the present invention will now be described in more detail with reference to FIGS. 8 and 9. The wind pump 2 is filled with a fluid such as, for example water or oil whose general level is indicated by dotted line 207. Generally, the fluid in the wind pump 2 will be the same as the fluid being pumped thereby. The level 207 of liquid in the pump 2 is not critical but should generally cover the various components which will be discussed hereinafter. A stationary element 206 is provided in the wind pump 2 in the middle region thereof which has a circular planar portion 222 which has a diameter generally equal to that of the first upper portion 202a of the wind pump 2. The stationary element 206 is mounted to the wall of the pump 2 by mounting means (not shown). The stationary element 206 therefore remains stationary with respect to the shaft 3. A number of blades 224 are attached to the lower surface 226 of the circular portion 222 of the stationary element. In one preferred embodiment of the present invention, six blades 224 are used but of course any other suitable number of blades can also be used. Each blade 224 is a generally thin rectangular block with the length of the block extending along the radius of the circular portion 222. The thickness of each block is generally very much less than the length thereof. A plurality of holes are provided in the stationary member 206 to allow fluid to flow above the stationary element 206.

A movable shield 230 is provided which interacts with the stationary element 206. Upper stops 210 and lower stops 212 define the uppermost and lowermost positions of the shield 230 which has a similar construction to that shown in FIG. 5. The blades 224 of the stationary element 206 are arranged to extend through respective cut-out portions 232 of the shield. The cut-out portions 232 correspond in position to the arrangement of the respective blades 224 on the circular portion 222 of the stationary element 206 As will be discussed in more detail hereinafter, the shield 230 is free to move upwardly towards the circular portion 222 of the stationary element 206 and in a downward direction away from the circular portion 222, the stops 210 and 212 limiting the extent of movement of the shield 230.

Below the stationary element 206 and the associated shield 230 is a first set 240 of blades 241. This first set 240 of blades 241 comprises a plurality of blades which are coupled to rotate with the shaft 3. There may be seven blades in the first set 240 of blades 241. If the number of blades 224 on the stationary element 206 is different from the number of blades 240 in the first set, vibrations may be reduced or avoided. However in some embodiments of the invention, the number of blades in the first set 240 of blades 241 may be the same as the number of blades 224 attached to the stationary element 206. There is a gap 225 provided between the stationary element 206 and the first set 240 of blades 241 so that the blades 241 are free to rotate, but at the same time there is an interaction, between the stationary blades 224 and the rotating blades 241. Between each pair of adjacent blades 241 of the set 240 of blades 241 is an aperture 244 in the shaft 3.

Below the first set 240 of blades 241 is a second set 246 of blades 248. It should be appreciated that the blades 248 of the second set 240 of blades are very much larger than the blades 241 of the first set 240 of blades. An appropriate clearance is provided between the first and second sets 240, 246 of blades. The second get 246 of blades 248 are also coupled to the shaft 3 and rotate therewith. The second set 246 of blades 248 also comprises a plurality of blades 248. Once again, between each pair of adjacent blades 248, an aperture 250 in the shaft 3 is provided. However, the apertures 250 for the second set 246 of blades 248 are much larger than apertures 244 for the first set of blades 241.

The number of blades in the first and second sets 240 and 246 of blades may be the same or different. In one preferred embodiment, the first and second set 240 and 246 are arranged so that the blades of the two sets are offset with respect to each other.

The blades 248, 241 of the first and second sets of blades 240, 246 are similar in construction to the blades 224 of the stationary element 206. However, the blades 240 and 246 of the first and second sets of blades are not attached to a circular plate. It should be appreciated that in certain embodiments of the invention, the circular plate of the stationary member 6 may be dispensed with.

As with the previous embodiments, the stationary element 206, the shield 230 and with the first set 240 of blades 241 provide protection against excessive speeds of rotation of the rotor. The second set 248 of blades 46 provide the pumping action.

Figure 8:
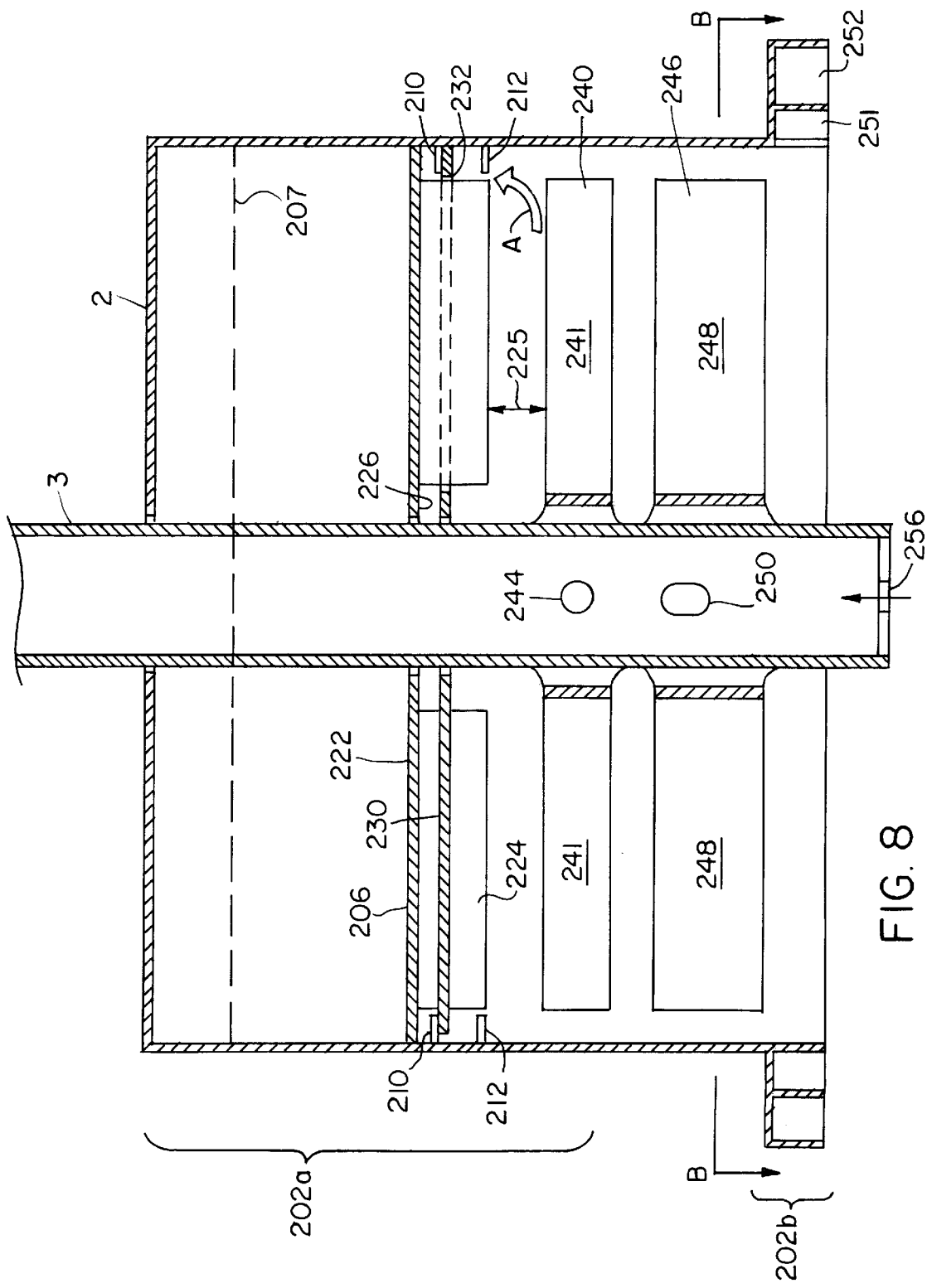
FIG. 8 is an enlarged part section through a pumping device embodying the invention.
Figure 9:
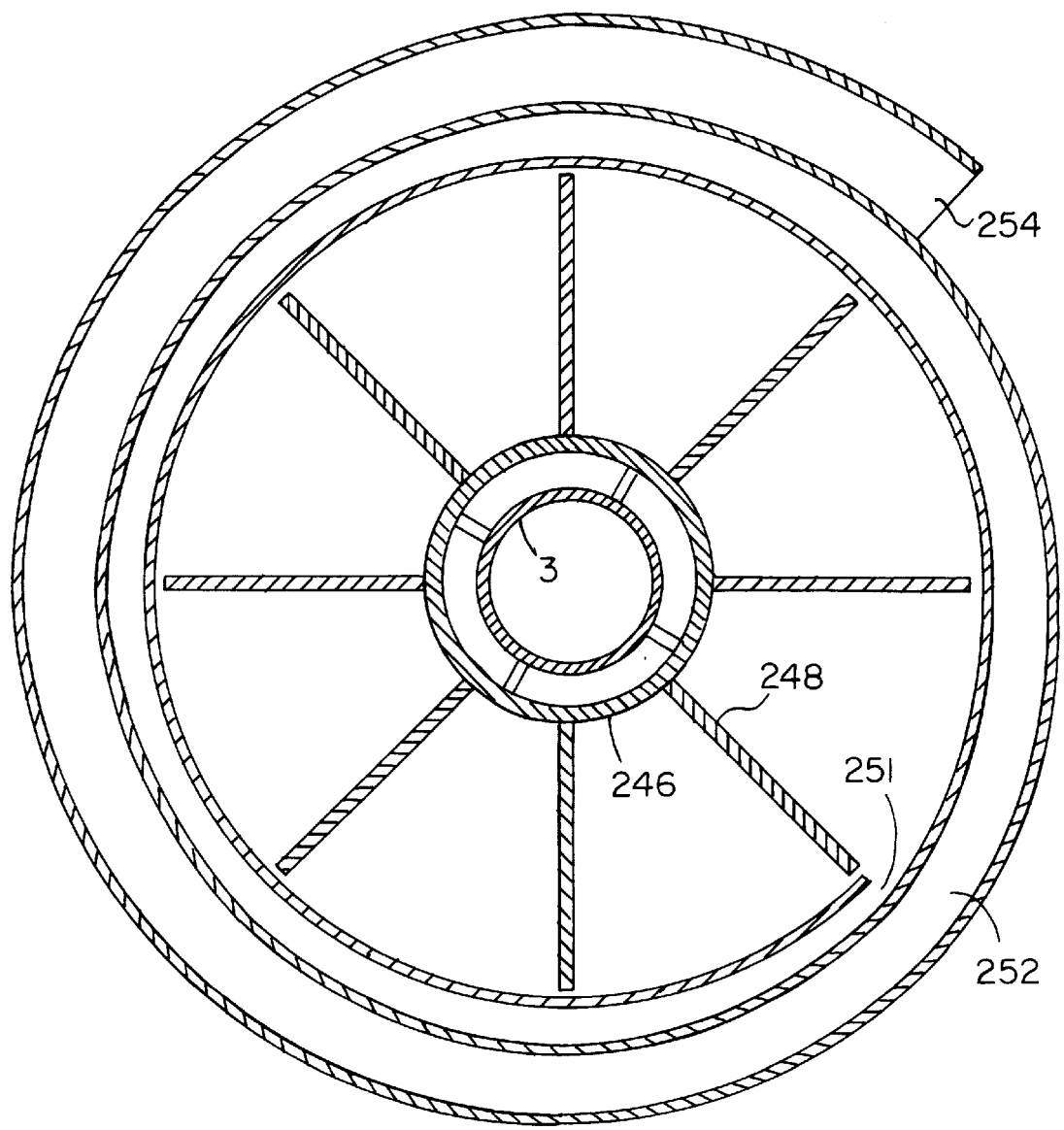
FIG. 9 is a line along B—B of FIG. 8.

As can be seen from FIGS. 8 and 9, adjacent the second set of blades 246 there is a spiral channel 252 into which fluid is directed. The cross-section of the channel 252 increases along its length as the diameter of the spiral defined by the channel 252 increases. The movement of the fluid caused by the second set of blades 246 causes the fluid to be directed outwardly towards the spiral channel 252. The spiral channel 252 extends all the way around the lower part 202b of the wind pump 2. The spiral channel 252 has an inlet 251 into which the fluid from the wind pump can enter and also has an outlet 254 through which the fluid pressurised by the second set of blades 246 can exit. It should be appreciated that an opening 256 is provided at the bottom of the shaft 3 which is connected to a supply of fluid.

The operation of the device will now be described. When the shaft 3 rotates, it also causes the first set of blades 240 and the second set of blades 246 to rotate therewith as these sets of blades are both coupled to the shaft 3. As the blades 248 of the second set 246 of blades rotates, a circular flow of liquid in the wind pump is generated. This circular flow of liquid causes fluid to be drawn up from opening 256 through the shaft 3 and out of the apertures 250. This fluid is accelerated radially along the blades 248 which further increases the circulation of liquid in the wind pump. The circulating fluid is guided by the blades 248 of the second set of blades 246 into the spiral channel 252, via inlet 251, surrounding the lower portion 202b of the wind pump 2. As the fluid is driven through this channel 252, its speed remains constant and the pumped fluid is then able to exit via exit 254. The outlet 254 may be arranged so as to supply water to, for example, fields for irrigation purposes. The spiral channel is contained in a single plane. The opening 256 will be connected to the fluid source which may be a water well. In this way, the fluid can be pumped using the wind pump 2.

The rotation of the shaft 3 also causes some of the fluid which enters the shaft 3 via inlet 256 to exit via the apertures 244 adjacent the blades 241 of the first set of blades 240. The fluid which is drawn out through apertures 244 is accelerated radially along the blades 241 of the first set of blades 240. This also generates a circular flow of liquid within the wind pump 2. Some of the accelerated fluid will pass into the channel 252. However, most of this fluid will move upwardly in the direction of arrow A. As will be appreciated, the greater the speed of rotation of the shaft 3, the greater the speed of rotation of the first set 240 of blades 241 and consequently the greater the rate of flow of liquid in the wind pump 2 in the upward direction of arrow A.

The flow of liquid upwardly in the wind pump 2 will exert an upward force on the shield 30. Accordingly, the position of the shield 230 relative to the blades 224 of member 206 will be determined by the magnitude of the upward force provided by the combination of the upward flow of liquid in the pump 202 generated by rotation of the first set 240 of blades 241 and the pressure difference across the plate generated by rotation of the first set 240 of blades 241. The greater the seed of rotation of the first set 240 of blades 241, the greater the rate of flow of the fluid and hence, the greater the upward force exerted by the fluid. The shield 230 will generally be urged downwardly as a result of its weight. When the shaft 3 is rotating sufficiently quickly, there will be a relatively large upward force on the shield member 230, caused by a relatively large upward flow of fluid. This upward force may be sufficiently large to overcome the downward force provided by the weight of the shield 230. This causes the shield 230 to move upwardly relative to the blades 224 of the stationary element 206. This increases the resistance to rotation of the shaft 3 caused by the interaction of the blades 224 of the stationary element 206 with the blades 241 of the first set of blades 240 to provide a braking effect on the rotor 1. The uppermost position of the shield 230 is limited by the upper stops 210.

If the speed of the shaft 3 then falls, the upward force generated by the flow of fluid is reduced so that the shield 230 moves downwardly so that the interaction between the blades 224 of the stationary element 206 and the blades 241 of the first set 240 of blades is reduced thus decreasing the braking effect on the rotor 1.

It should be appreciated that the second set of blades will also contribute to the upward movement of liquid. However, the apparatus is arranged so that most of the liquid will be directed into the channel 252 as a result of the rotation of the second set of blades 246.

Typically, the spacing between the blades 224 of the stationary member 206 and the first set 240 of blades 241 is the order of 3 mm. A similar spacing is provided between the first 240 and second 246 sets of blades. The blades 248 of the second set of blades 246 will typically have five times the area as the first set 240 of blades 241 and the blades 224 of the stationary member 6 combined. All the blades 224, 241 and 248 are generally planar and rectangular in shape.

The blades 248 are therefore arranged to draw fluid through the inlet 256 and to drive the fluid radially with a centrifugal force. The fluid is given a radial velocity and a whirl velocity. Whirl velocity is the rotational velocity of the fluid in the channel. When the fluid is in the channel 252, the radial velocity converts to a pressure head. That radial flow of fluid will flow to the lowest pressure points which will be the inlet of the channel 252 and the middle of the wind pump 2. Thus, the fluid will move towards the inlet of the channel 252.

A temperature sensitive arrangement may be connected to the shield 230. In this arrangement, a temperature sensitive element is arranged to move the shield to its uppermost position so that the resistance to rotation of the drive shaft 3 is increased if the temperature exceeds a given value. In this way, the speed of the rotor 1 can be reduced which in turn reduces the heating effect which may be provided by the rotation of the various blades in the reservoir. Thus, excessive temperatures in the wind pump can be avoided.

The rotor described in relation to the first embodiment can be used with any of the other embodiments of the invention.

In one modification of the rotor which can be used with any of the previously described embodiments, the blades 4 are replaced by a cup anemometer which defines a savonius turbine. The convex surface of a cup presents less drag to the wind than the concave surface of a cup arranged opposite thereto. The differential drag causes the rotor to rotate.

Figure 10:
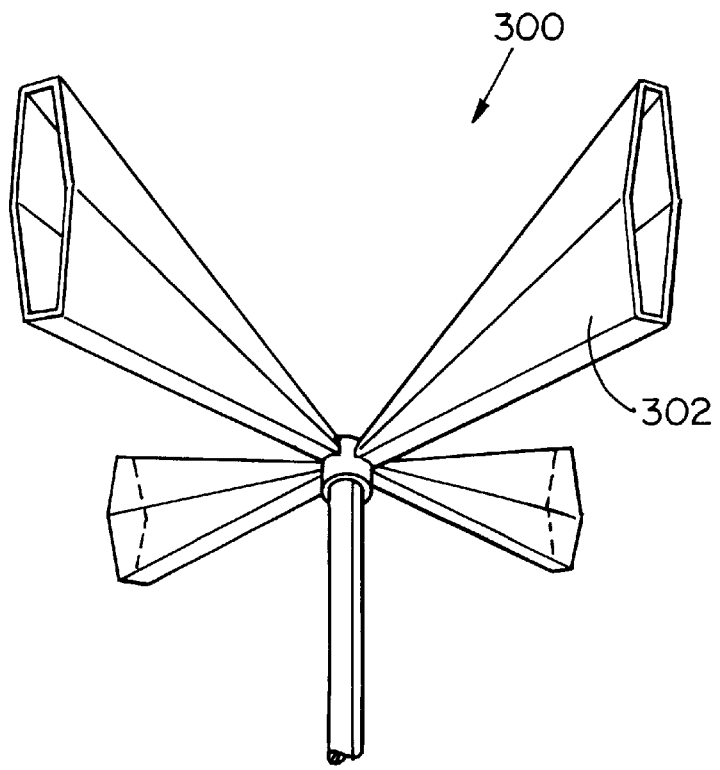
FIG. 10 shows a side elevation of a modified rotor.

Reference will now be made to FIG. 10 which shows an alternative embodiment of the rotor which can be used with any of the above described embodiments. The rotor 300 shown in FIG. 10 is a four blade 302 darrius rotor. To increase the life of the rotor the four blades are held at their ends by radial ties. The design of this rotor is such that the rotor is self starting. However, in one modification of the rotor 300 shown in FIG. 10, a savonius starter which provides a differential drag is provided at the centre of the rotor 300.

Finally, whilst embodiments of the present invention has been described in relation to wind-powered device, it will be appreciated that the present invention also has application to other fluid driven devices such as water powered or gas driven pumps.

What is claimed is:

1. A wind operated heating device comprising:
   rotatable driving means;
   a heater comprising a liquid reservoir and rotary means at least partially immersed, in use, in liquid within the reservoir and arranged to be driven in rotation so as to thereby heat the liquid;
   means connecting the rotary means to the rotatable driving means to be driven thereby; and
   a shield member arranged to rotate with said rotary means and movable relative thereto where the position of said shield member relative to the rotary means varies with the rotation speed of the rotary means, the position of the shield member relative to the rotary means at higher speeds of rotation results in greater resistance to rotation of said rotary means than at lower speeds of rotation.

2. A device as claimed in claim 1, wherein a rotary arrangement arranged to rotate with said rotatable driving means is provided, which comprises at least one arm movable outwardly under the action of centrifugal force, said shield member being coupled to said at least one arm, wherein the position of said at least one arm and thus the shield coupled thereto is dependent on the speed of rotation of said rotable driving means.

3. A device as claimed in claim 1, wherein further interacting means are provided in said liquid reservoir for interacting with said rotary means.

4. A heating device comprising:
   rotatable driving means;
   a heater comprising a liquid reservoir and rotary means at least partially immersed, in use, in liquid within the reservoir and arranged to be drive in rotation so as to thereby heat the liquid;
   means connecting the rotary means to the rotatable driving means to be driven thereby;
   a movable shield member for changing the resistance to rotation of the rotatable driving means in dependence on the speed thereof, wherein the position of the shield member influences the resistance to rotation of the driving means and is alterable in dependence on the rate of flow of liquid in the liquid reservoir, said rate of flow of liquid being dependent on the speed of rotation of the rotatable driving means.

5. A heating device as claimed in claim 4, wherein said shield member is arranged adjacent interacting means provided in the liquid reservoir for interacting with the rotary means.

6. A heating device as claimed in claim 4, wherein centrifugal pump means are provided in said liquid reservoir for generating said flow of liquid.

7. A heating device as claimed in claim 4, wherein a portion of said connecting means is arranged to be immersed in said liquid reservoir, said portion of the connecting means being hollow and having a plurality of openings to permit the flow of liquid through said portion of the connecting means.

8. A heating device as claimed in claim 7, wherein said device is arranged so that liquid flows downwardly through said portion of the connecting means and upwardly through the liquid reservoir to move the movable shield member upwardly when the speed of rotation of the rotatable driving means exceeds a given value.

9. A heating device as claimed in claim 6, wherein said interacting means for interacting with the rotary means are arranged on a first side of the rotary means and the centrifugal pump means are arranged on a second side of the rotary means, opposite to said first side.

10. A heating device as claimed in claim 4, wherein a plurality of plates are provided, said plates being substantially L-shaped, the first portion of each plate extending substantially perpendicular to an axis of rotation of said connecting means and a second portion extending along a portion of the wall of said liquid reservoir, said plates being arranged to interact with said rotary means.

11. A wind operated heating device comprising:
   rotatable driving means;
   a heater comprising a liquid reservoir and rotary means at least partially immersed, in use, in liquid within the reservoir and arranged to be driven in rotation so as to thereby heat the liquid;
   means connecting the rotary means to the driving means to be driven thereby;
   a movable member arranged to move in said reservoir wherein the position of said member in the reservoir influences the resistance to rotation of the rotatable driving means; and
   a temperature sensitive device which when the temperature exceeds a given level is arranged to cause the member to move to a position such that the resistance to rotation of the rotary means is increased.

12. A method of heating liquid provided in a reservoir using wind power comprising the steps of:
   driving rotary means within the liquid reservoir to thereby heat the liquid;
   generating a circular flow of liquid in said reservoir with said rotary means, said flow of liquid exerting pressure on a movable member within said reservoir, whereby when the rate of flow of liquid in said reservoir exceeds a given value, the movable means is moved by the pressure of said flow of liquid into a position relative to the rotary means that results in increased resistance to rotation of the rotary means.

13. A method of heating liquid provided in a reservoir using wind power comprising the steps of:

driving rotary means within the liquid reservoir to thereby heat the liquid;

moving a movable shield member relative to the rotary means, the position of the shield member relative to the rotary means being dependent on the speed of rotation thereof, whereby when the speed of rotation exceeds a given level, the resistance to rotation of the rotary means is increased.

14. A method of heating liquid provided in a reservoir using wind power comprising the steps of:

driving rotary means within the liquid reservoir to thereby heat the liquid;

providing temperature sensitive means in said reservoir, wherein when the temperature in the reservoir exceeds a given value, the temperature sensitive device causes a movable member to adopt a position in which the resistance to rotation of the rotary means is increased.

* * * * *